(12) United States Patent
Arkenberg et al.

(10) Patent No.: US 9,852,766 B2
(45) Date of Patent: Dec. 26, 2017

(54) USER INTERFACE FOR SYNCRONIZING AUDIO WITH VIDEO DATA

(71) Applicant: Orange, Paris (FR)

(72) Inventors: Chris Arkenberg, Oakland, CA (US); Kevin Cheong, San Francisco, CA (US); Guillaume Payan, San Francisco, CA (US)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/978,344

(22) Filed: Dec. 22, 2015

(65) Prior Publication Data

US 2016/0180885 A1 Jun. 23, 2016

Related U.S. Application Data

(60) Provisional application No. 62/095,549, filed on Dec. 22, 2014.

(51) Int. Cl.
| | |
|---|---|
| *G11B 27/00* | (2006.01) |
| *H04N 5/93* | (2006.01) |
| *G11B 27/034* | (2006.01) |
| *G11B 27/34* | (2006.01) |
| *G06F 3/0481* | (2013.01) |
| *G11B 27/031* | (2006.01) |
| *G11B 27/10* | (2006.01) |

(52) U.S. Cl.
CPC .......... *G11B 27/034* (2013.01); *G06F 3/0481* (2013.01); *G11B 27/031* (2013.01); *G11B 27/10* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 8,009,966 B2 | 8/2011 | Bloom et al. | |
| 8,802,957 B2* | 8/2014 | Barker | G11B 27/034 715/723 |
| 2005/0084232 A1* | 4/2005 | Herberger | G11B 27/34 386/282 |
| 2010/0281376 A1* | 11/2010 | Meaney | G11B 27/034 715/723 |

* cited by examiner

*Primary Examiner* — Heather Jones
(74) *Attorney, Agent, or Firm* — David D. Brush; Westman, Champlin & Koehler, P.A.

(57) ABSTRACT

A method for recording voice samples for video rendered on an electronic device including a display unit and a microphone. The video includes image data and voice data, and the voice data has one or more time intervals when the voice data is to be rendered with corresponding image data. The method is executed by a processor of the electronic device and includes displaying on the GUI a videoplayer element and a graphical or progress element representing progress of the video, the progress element including one or more selectable elements, each being associated to a time interval of the voice data and positioned on the progress element according to the time interval. When a user selection is received on a first selectable element, the microphone records sound data while the video player element is simulataneously played. The image data corresponds to the time interval associated to the first selectable element.

10 Claims, 8 Drawing Sheets

USER INTERFACE FOR SYNCRONIZING AUDIO WITH VIDEO DATA

CROSS-REFERENCE TO RELATED APPLICATIONS

This Application claims benefit to U.S. Provisional Patent Application No. 62/095,549, filed Dec. 22, 2014, the content of which is hereby incorporated by reference in its entirety.

FIELD OF THE PRESENT SYSTEM

The present disclosure generally relates to media files, and more specifically to a graphical user interface for synchronizing audio and video files.

BACKGROUND OF THE PRESENT SYSTEM

Today most electronic devices such as mobile devices or laptop computers support the playback or rendering of digital content comprising a digital video or image content synchronized with a digital audio content. The digital content may be stored as a data file on either fixed or removable disks, or downloaded over the Internet for a direct playback using streaming or subsequent playback once the download is over. Such electronic devices generally are equipped with a sound card to record sound input from a microphone. More complex sound cards like a "full duplex" sound card enable the recording of sound input while simultaneously playing background audio and video signals from an existing digital content. This is used notably for dubbing a movie in a foreign language where the original voice tracks in the audio content are replaced with new voice tracks in a different language.

Synchronization is essential in dubbing as a user will read outloud lines, providing audio or sound inputs that are recorded to replace the initial voice tracks. Document U.S. Pat. No. 8,009,966B2 discloses a method and user interface for replacing original actors' or singers' voices in a digitized film or video with a replacement lip-synced version created automatically from a user's recording of the dialog or singing. Such teaching may be used for dubbing as mentioned before, or for amusement when users are try to replace the original voices and lines with their own voice and dialogs.

Figure 3:
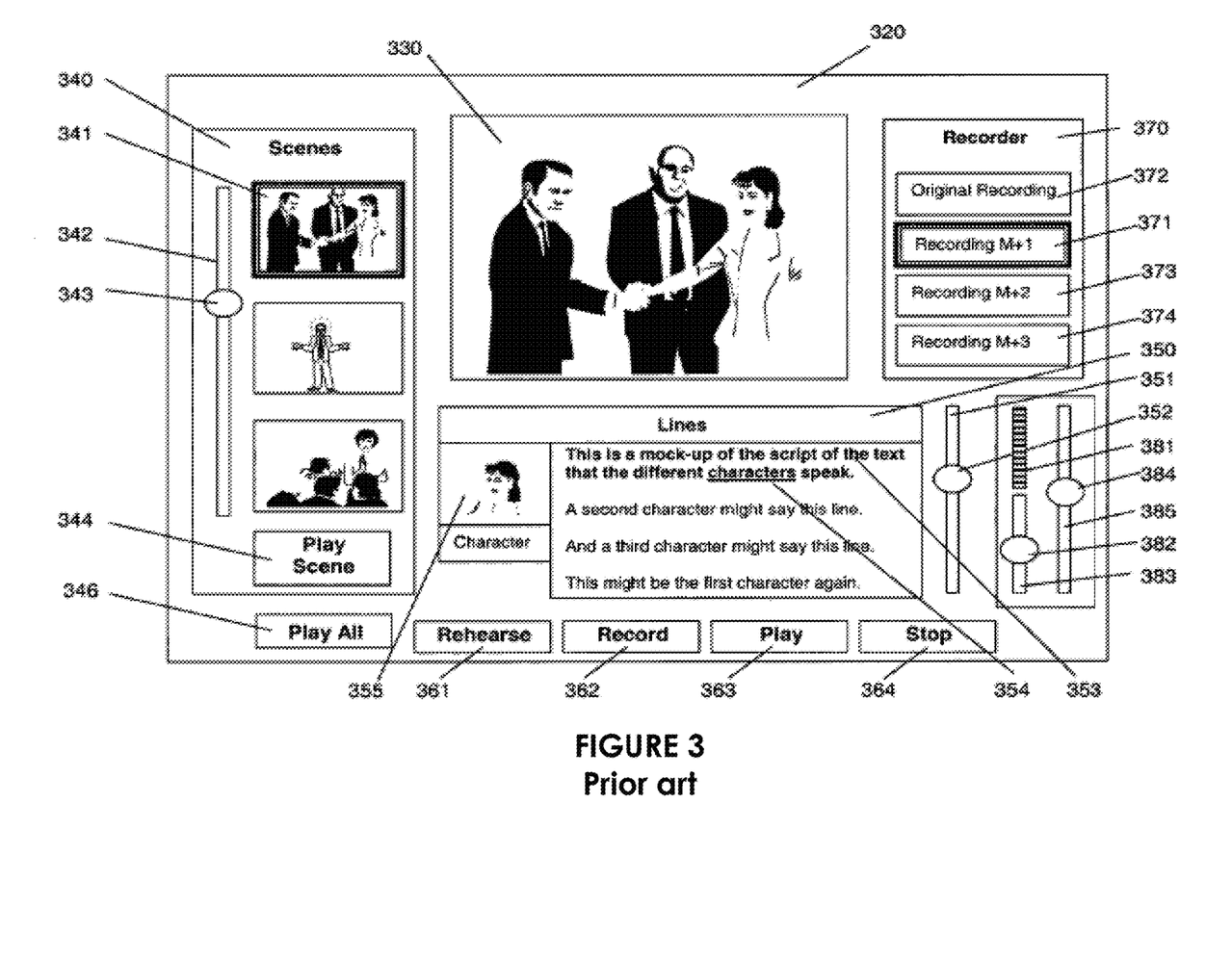
FIG. 3, shows a known GUI for revoicing a media content.

FIG. 3 discloses a known user interface (UI) to revoice a digital content according to document U.S. Pat. No. 8,009,966B2. The user selects a scene 341 to revoice from a digital audio/video content, also called here after a (digital) media content using selector element 340. The scene selection will cause the UI to display the different lines to be displayed in a line selector 350, as the media content is stored with metadata such as lines of dialogues for each character present in the content. The user then may select one or more specific lines 353 to revoice for the selected scene 341. The line selection may be performed through the character element 355 that highlights the lines for a character in the selected scene 341. The user will then be able to record his own voice speaking the selected lines (or his alternative dialogue) having been given visual cues for when to start speaking and when to say the original words or sounds in each line. As explained in the document, the cues may be in the form of a countdown displayed on the UI after the record icon 362 is selected. The recording of the user's voice will start at the end of the countdown. Following or during recording, without the user's intervention, the system will automatically process and edit the user's recorded lines (or voice samples) to create a revoiced version synchronized to those of the original character's audio. The result may be visible through selecting the play icon 363 causing the recorded voice sample to be played in sync with the corresponding original video. Consequently, the revoiced version of the selected scene 341 will generally be rendered with the recorded voice in synchronization with the character's lip movements.

Such a known UI nevertheless required a large number of steps and selections from the user. Furthermore, as may be seen from FIG. 3, the UI remains complex with many different elements to sort out for the user in order to produce the revoiced version of a selected scene. Different icons (record, play, stop) are needed to execute the revoicing as in document U.S. Pat. No. 8,009,966B2.

Today there is still a need to an improved revoicing UI available on an electronic device. There is a further need for a simplified revoicing UI allowing direct access to the revoicing of a digital media content.

SUMMARY OF THE PRESENT SYSTEM

The present system relates to a method for recording voice samples for a video rendered on an electronic device comprising a display unit and a microphone, the video comprising image data and voice data, the voice data being characterized with one or more time intervals when said voice data is to be rendered with corresponding image data, the method being executed by a processor of the electronic device, the method comprising:

- rendering on the display unit a graphical user interface (GUI) comprising a video player element to play the video,
- displaying on the GUI a graphical or progress element representing the progress of the video, the progress element comprising one or more selectable elements, each selectable element being associated to a time interval of the voice data and positioned on the progress element according to said time interval,
- when receiving a user selection on a first selectable element, recording sound data using the microphone while simultaneously playing with the video player element the image data corresponding to the time interval associated to the first selectable element.

Thanks to the present method, the user can record sounds such as voices directly on specific time intervals of a video content where sound input may be needed for insertion or replacement of existing sounds. Each selectable element, which may be seen as a control element, allows direct control over the recording for an associated time interval in the video. Indeed selecting a first control/selectable element will trigger, for a time interval where sound input is needed in the video, the recording of sound using the microphone while rendering the corresponding image data on the GUI. The user is given a direct access to a specific moment in the video and can record in own input in synch with the image data for that moment. The present system enables thereby an easy revoicing or sound recording service through the use of a revoicing application program and GUI.

The present system also relates to an electronic device electronic for recording voice samples for a video, the electronic device comprising a display unit and a microphone, the video comprising image data and voice data, the voice data being characterized with one or more time intervals when said voice data is to be rendered on the electronic device with corresponding image data, the electronic device comprising a processor arranged to:

render on the display unit a graphical user interface (GUI) comprising a video player element to play the video, display on the GUI a graphical or progress element representing the progress of the video, the progress element comprising one or more selectable elements, each selectable element being associated to a time interval of the voice data and positioned on the progress element according to said time interval, when detecting a user selection on a first selectable element, record sound data using the microphone while simultaneously play with the video player element the image data corresponding to the time interval associated to the first selectable element.

The present system also relates to an application embodied on a non transitory computer readable storage medium and executable by an electronic device in the form of a software agent including at least one software module comprising instructions to:

render on a display unit of the electronic device a graphical user interface (GUI) comprising a video player element to play the video, the video comprising image data and voice data, the voice data being characterized with one or more time intervals when said voice data is to be rendered with corresponding image data, display on the GUI a graphical or progress element representing the progress of the video, the progress element comprising one or more selectable elements, each selectable element being associated to a time interval of the voice data and positioned on the progress element according to said time interval, when detecting a user selection on a first selectable element, record sound data using a microphone of the electronic device while simultaneously playing with the video player element the image data corresponding to the time interval associated to the first selectable element.

BRIEF DESCRIPTION OF THE DRAWINGS

The present system is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims.

Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. An operative coupling may also include a wired and/or wireless coupling to enable communication between a media content platform or server and one or more electronic devices in accordance with an embodiment of the present system. An operative coupling may also relate to an interaction between program portions and thereby may not describe a physical connection so much as an interaction based coupling.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface such as a video player on a display device so that it may be seen and interacted with by a user. The term rendering may also comprise all the actions required to generate a GUI prior to the display, like e.g. a media or video player interface generated on a server side for a browser application on a user device.

The system, device(s), method, user interface, etc., described herein address problems in prior art systems. The man skilled in the art may easily apply the present teachings to any electronic device presenting a touch sensitive panel, (referred also hereafter as a touch sensitive display or screen), a pointing device (like a mouse) or a keyboard.

In accordance with an embodiment of the present system, an electronic device provides an improved GUI for revoicing a video content through user inputs, such e.g. as touch or mouse inputs. In the description hereafter, reference will be made to a mobile device or handsets. This is in no way a limitation of the present method as the teaching herein may be applied to any electronic device presenting a touch interface or a pointing device such as a mouse. Such electronic device may be for instance a tablet, desktop or laptop, server . . . .

A graphical user interface (GUI) may be provided in accordance with an embodiment of the present system:

by an application program (AP) running locally on a processor, such as part of a computer system of a mobile device, and/or, as provided by a network connected device or web based server, such as a content server providing content to the user device, the GUI being rendered on a user device through a local application program (e.g. a browser or web application) connected to the media content server.

Figure 2:
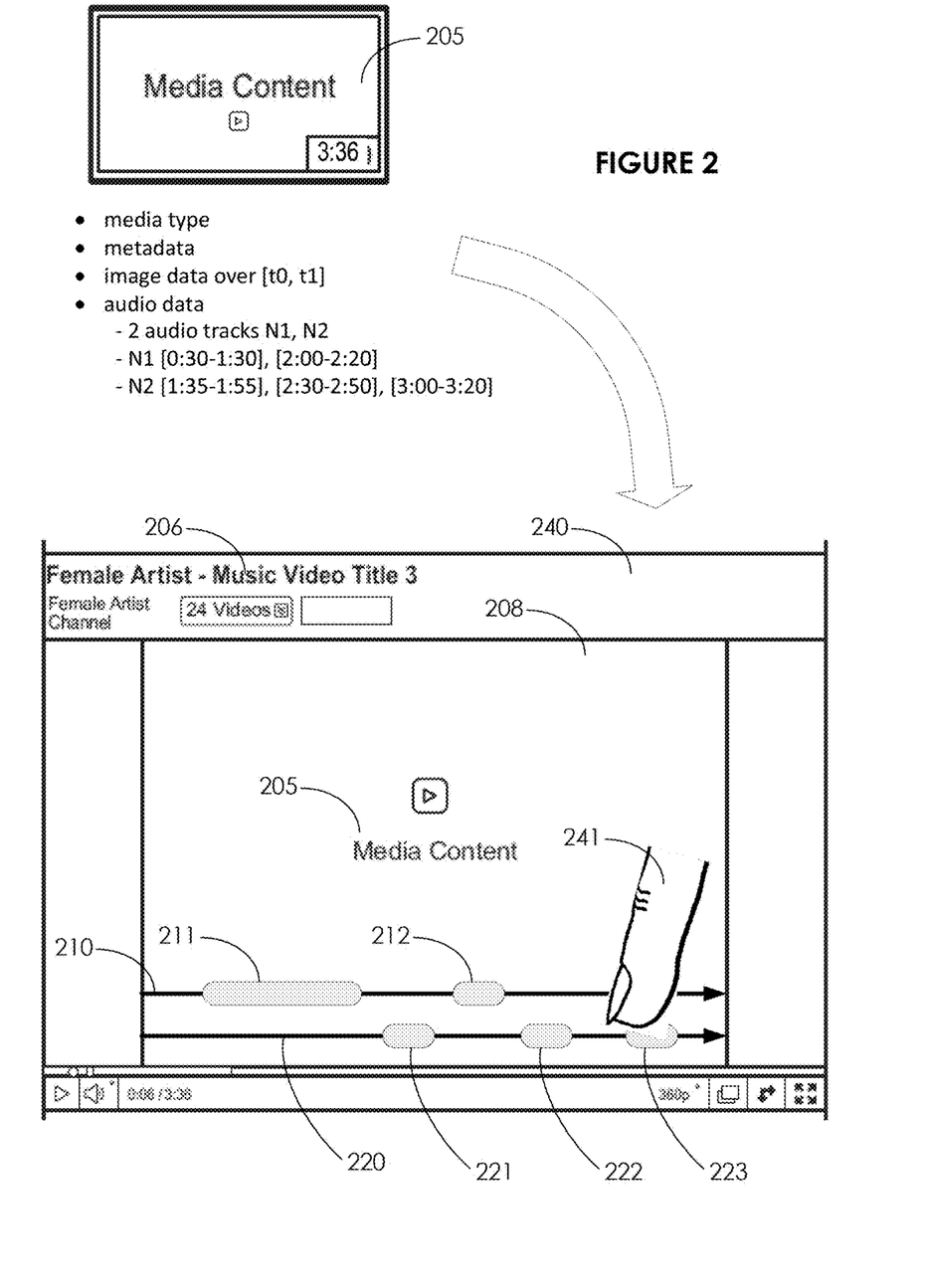
FIG. 2 shows the GUI obtained from a digital media content in accordance with another embodiment of the present system.

For instance, the present GUI enabling the revoicing of a digital media content may be generated on a server side for rendering on a web browser hosted on the mobile device. Alternatively, the present GUI may be rendered by a local AP using the characteristics of a digital media content as shown in FIG. 2. The provided visual environment in both examples may be displayed by the processor on a display device or screen of the user device, e.g. a touch sensitive panel (touch panel in short), which a user may use to provide a number of touch inputs of different types.

A GUI is a type of user interface which allows a user to interact with electronic devices such as computers, handheld devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images or elements in order to initiate functions and tasks, i.e. controls, associated therewith. By way of example, a user can select a selectable element such as a button that opens, closes, minimizes, or maximizes a window, or such as a virtual representation or icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system (OS) such as Android™.

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display.

Figure 1:
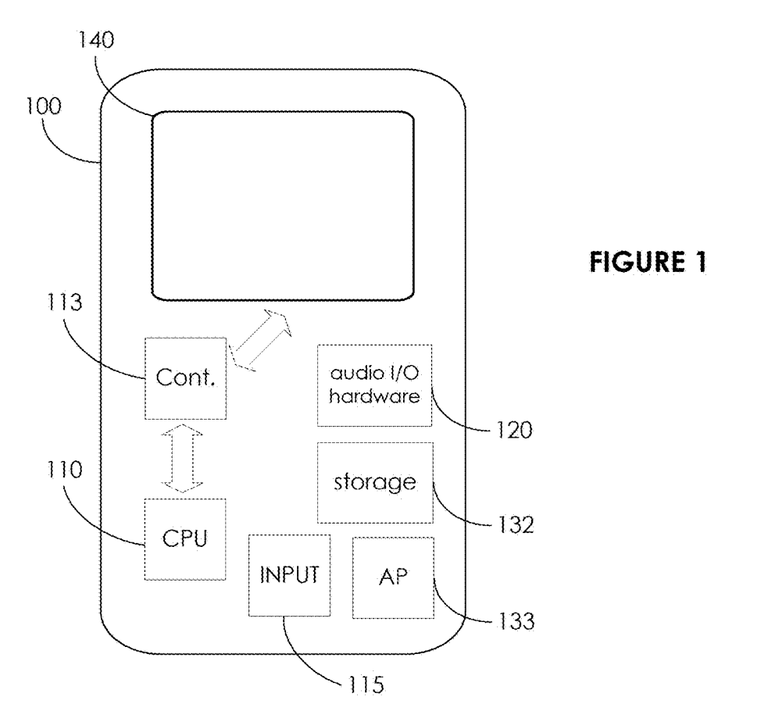
FIG. 1 shows an electronic device in accordance with an embodiment of the present system.

FIG. 1 is an illustration of an exemplary user device 100 used in the present system. In the here after description, the user or electronic device will be illustrated as a mobile device 100 with a touch interface. This illustration is in no way limiting as the present teaching would work for any user devices such as laptops, pads, desktops and the likes, enabling the user to interact through a touch interface, a poiting device and/or a keyboard. The mobile device 100 comprises a display device or unit 140, a processor 110, a controller 113 of the display device, an audio I/O 120 such as a microphone and an input device 115.

In the present system, the user interaction with and manipulation of the revoicing AP rendered on a GUI is achieved using the display device 140, i.e. a screen, which is presently a touch panel operationally coupled to the controller 113. A distinct input device 115 such as a keyboard may be optionaly provided.

Processor 110 may control using controller 113 the rendering of the GUI on the display device 140 depending on the type of application program, i.e. resident or web-based. Processor 110 may also handle the user entries according to the present method. The user entries to interact with an application program may be provided through interactions with the touch panel 140.

The touch panel 140 can be seen as an input device allowing interactions with a finger of a user or other devices such as a stylus. Touch sensor interface or touch panel 140 may include any suitable circuitry to convert analog signals corresponding to touch input received over its surface into any suitable digital touch input data. Such touch input data can, for example, be used to make selections of portions of the GUI of an AP such as selectable elements 211, 212, 221 and 222 in FIG. 2. The input received from a user's touch on the panel 140 is sent to the processor 110 for further processing. The touch panel 140 is configured to detect and report the (location of the) touches to the processor 110, which can interpret the touches in accordance with the application program and the currently displayed GUI. For example, the processor 110 can initiate a task, e.g. a control of the AP to start or trigger the microphone 120 for recording of an audio sound.

The controller 113, e.g. a dedicated processor, may be provided to process input touches locally and reduce demand for the main processor 110 of the mobile device. The touch panel 140 can be based on sensing technologies including but not limited to capacitive sensing, resistive sensing, surface acoustic wave sensing, pressure sensing, optical sensing, and/or the likes. Here after, for simplification purpose, reference will be made to a finger of the user touching panel 140, other devices such as a stylus may be used in place of the user finger.

The user device 100 further comprises an audio Input/Output (I/O) unit such as a microphone 120 to record sound such as voices from users to revoice the audio tracks of a media content. Such an audio I/O hardware component may also include a sound card to enable the present revoicing method. A storage 132 is also provided for storing the digital media content to be revoiced using the present system. Alternatively the medica content may be streamed over a data connection used by the mobile device 100 (connectivity module not shown in FIG. 1).

The user device 100 also comprises an AP 133 for enabling the present revoicing service. The AP 133 may be a browser when the present GUI is generated by a media server (not shown in FIG. 1) or a dedicated revoicing AP when the GUI is generated locally. The AP 133 may comprise an media player embedded therewith or rely upon a media player provided on the user device 100 (not shown in FIG. 2).

FIG. 2 is an exemplary embodiment of a GUI generated in accordance with the present system. A digital media or video content 205 will comprise image data, sound data and further meta data characterizing the video content. The meta data may comprise:
- the type of media content, like MPEG4, AVI, WMV or any know video format, the type being used by the media player to render the video content 205,
- the duration of the video content 205 over an interval [t0, t1],
- other data 206 such as title, date of production, actors and actresses, miscellaneous crew . . . .

The image data may comprise the different images that when rendered continuously using a media or video player will form the video content to be revoiced. The image data is available for the time interval [t0, t1].

The sound ou audio data may comprise:
- the number of audio tracks, for instance illustrated in FIG. 2 with two tracks N1 and N2. Each track will correspond to a different audio source, like the voice of a character present in a scene depicted in the video content. There may be e.g. as many tracks as different characters in the media content 205. Each source may be characterized with a different tag, for instance a tag pointing to a character's name, or actor/actress, so that each audio track may be readily identified by the present revoicing service, as explained here after, one or more time intervals [ti, tj] when the audio tracks are to be rendered with corresponding image data. By time interval one may understand the beginning and ending (or beginning and duration) timestamps in the video when audio data such as voices are present and played in synch with the image data. Each audio track may comprise one or more time intervals. In the illustration of FIG. 2, the first audio track N1 is associated to times intervals [0:30-1:30] and [2:00-2:20], while the second audio track is associated to the time intervals [1:35-1:55], [2:30-2:50] and [3:00-3:20], the times being expressed in minutes and seconds, optionally a text transcript of the audio data that may be used for display on the GUI while the image data is played. This could be used to help the user recite the lines for the audio input he wants to revoice.

The stored or streamed media content may be already associated to the sound data and time intervals as described here above. Alternatively, when not available, the video content may be analyzed using any known voice analyzing technique to extract the voice track(s) and associated time intervals when sound data such a voice is associated to the time data of the video.

Thanks to the present system, a GUI 240 may be generated on the display unit 140. The GUI 240 will comprise a video player element 208 for rendering the media content 205. The further data 206 may be displayed for providing further information on the content to the user. Using the voice data of video 205, one or more progress elements 210, 220 may be rendered on the GUI 240. The progress elements 210 and 220 may be rendering in the form of a progress bar or axis extending across one side of the video player element 208. Such a progress bar may be seen as a timeline of the video. Today most media player comprise a progress bar extending across the video lower side. The progress element(s) of the present system may appear as other progress bar(s) to give a visual feedback to the user as to where in the video timeline the voice tracks to be revoiced may be. Indeed, each progress bar will comprise one or more selectable elements such as elements 211, 212, 221, 222, 223. Each selectable element is a graphical element associated to a time interval of the voice data and positioned on the progress element 210 or 220 according to that time interval.

In an additional embodiment of the present system, each selectable element may be represented using a GUI element the length of which is proportional to its associated time interval. This will give the user a sense of the duration of the voice track for a specific selectable element he may select.

In the illustration of FIG. 2, media content 205 comprises 2 tracks identified respectively using the tags N1 and N2. In the present method, a progress bar will be displayed on the GUI for each identified tag, presently a first progress bar 210 and a second progress bar 220. Both progress bars appears as distinct timelines for the audio data of the media content 205.

The selectable elements, as associated to a time interval of the voice data, corresponds to selectable icons. The elements are actually control elements as once a user input 241 is detected on a first selectable element like element 223 in FIG. 2, the processor 110 is arranged to:

retrieve the time interval $T_1$ associated to the first selectable elements 223, activate the I/O hardware element 120, e.g. the microphone, to record sound data, while simultaneously playing with the video player element the image data corresponding to the time interval $T_1$ associated to the first selectable element 223, In an additional embodiment of the present method, the processor 110 may be further arranged or configured to:

animate the first selectable element 223 with a virtual representation of the recording progress after being selected by a user through user input 241, as the sound recording is active for $T_1$. This may be for instance a visual feedback as seen in FIG. 4B in the form of an oscillating curve displayed on the first selectable element 223 showing that the recording is active, change the state, i.e. properties of the first selectable 223 once the time interval $T_1$ is lapsed. This may be used for instance to activate other functions of the selectable element, like a drop down menu to offer replay, restart of the recording, erase or finish. Selecting finish will cause the replacement of the voice data for the time interval $T_1$ with the recorded sound data.

In other words, thanks to the present system, each selectable element is associated to image data when audio data is present, audio data that may be replaced by a user's own sound input. A selectable element may be seen as a shortcut to position the rendering of the video when voice data may start for a given time interval. The selection of the selectable element will trigger the rendering of the image data while the device records sound data over the given time interval. Once the recording is over, i.e. the time interval is lapsed, the recorded sound data will replace the initial voice data in the video content for the given time interval.

In an additional embodiment of the present method, only the image data in the media content may be rendered as the sound data is recorded. This may help the user performing the revoicing to focus on his own dialog, voice or both. Alternatively, if the user wants to rephrase the original lines with his own voice, the original sound data for the time interval associated to the first selectable element may be rendered for instance at a controlled low volume.

Figure 4A:
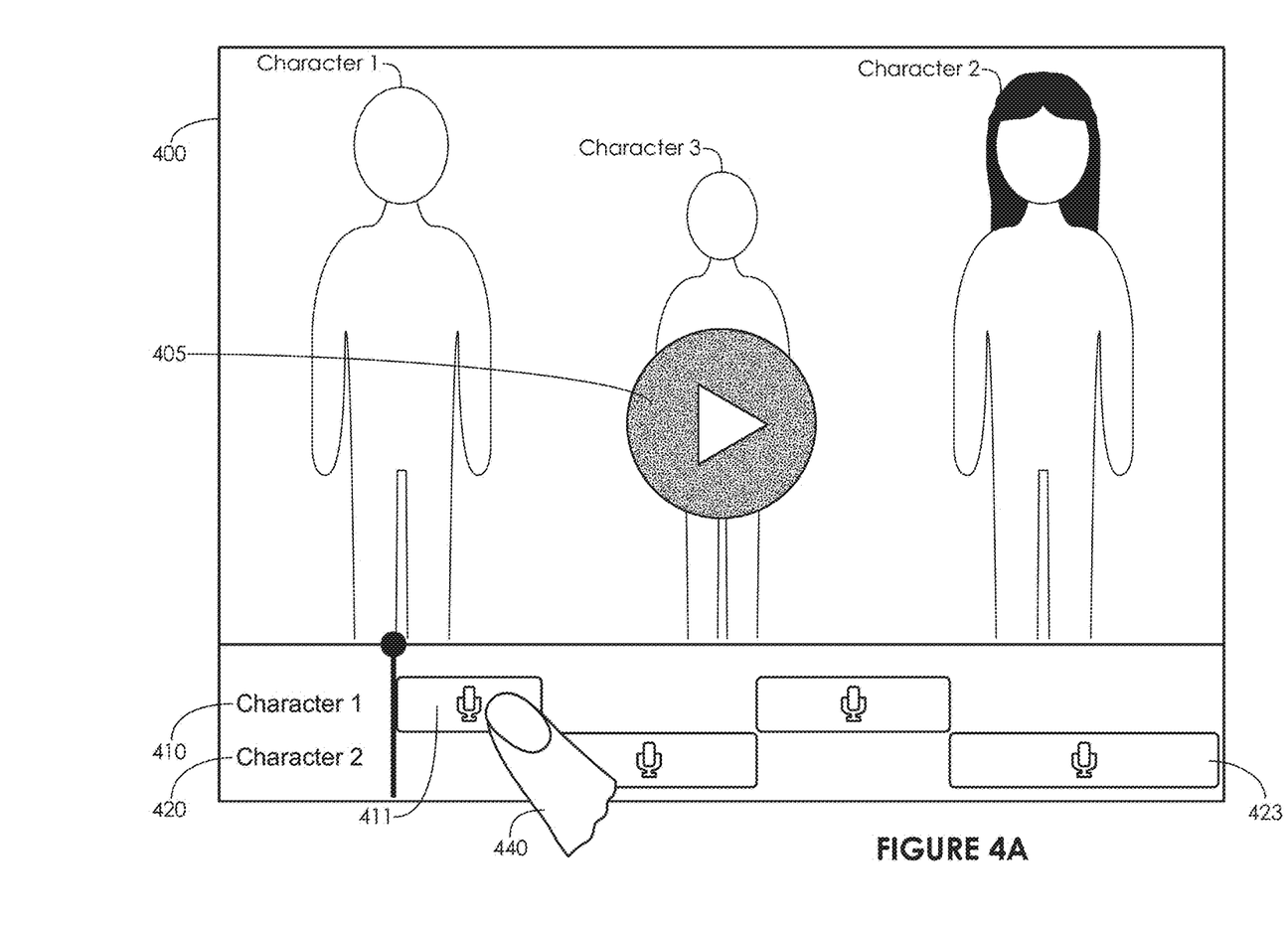
FIGS. 4A-D show exemplary GUIs in accordance with another embodiment of the present revoicing method; and, FIG. 5 shows a flow chart according to an embodiment of the present revoicing method.
Figure 4B:
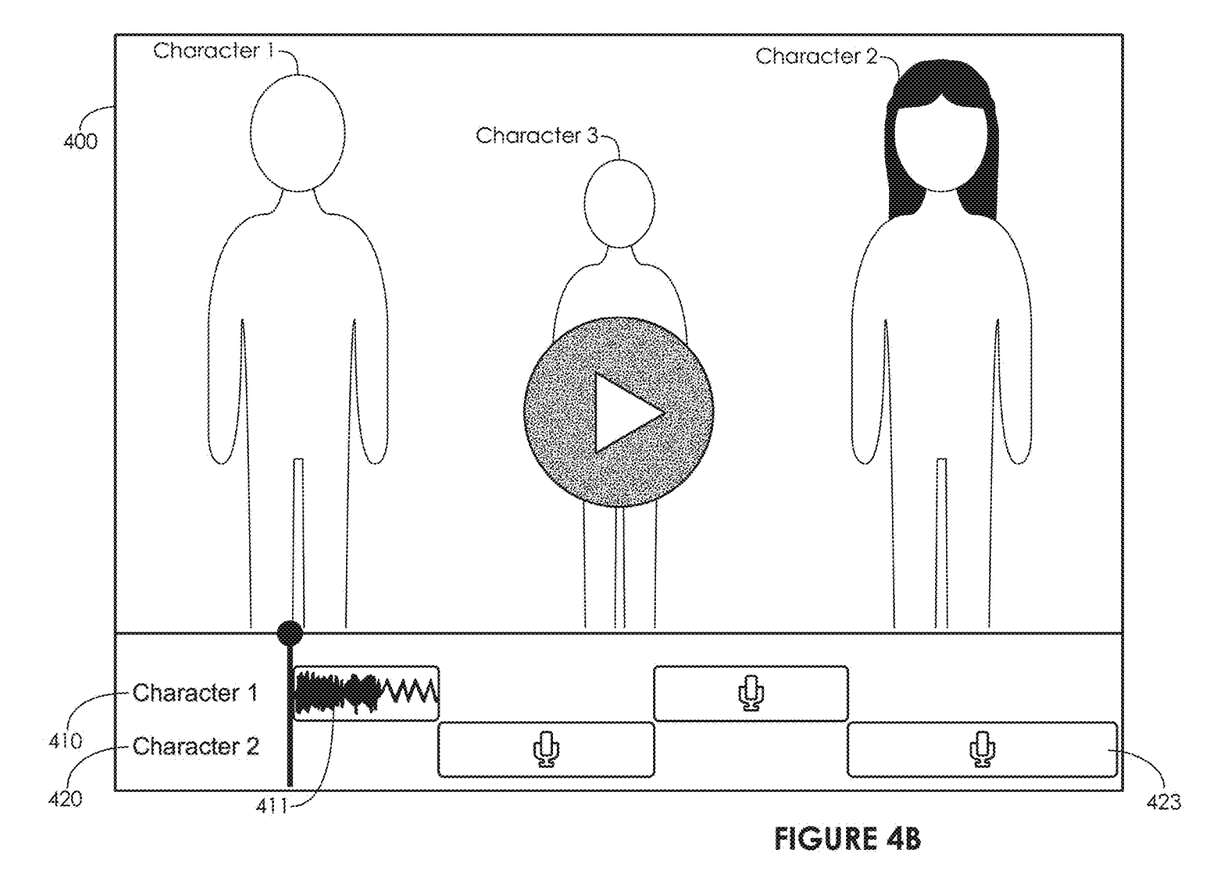
Figure 4C:
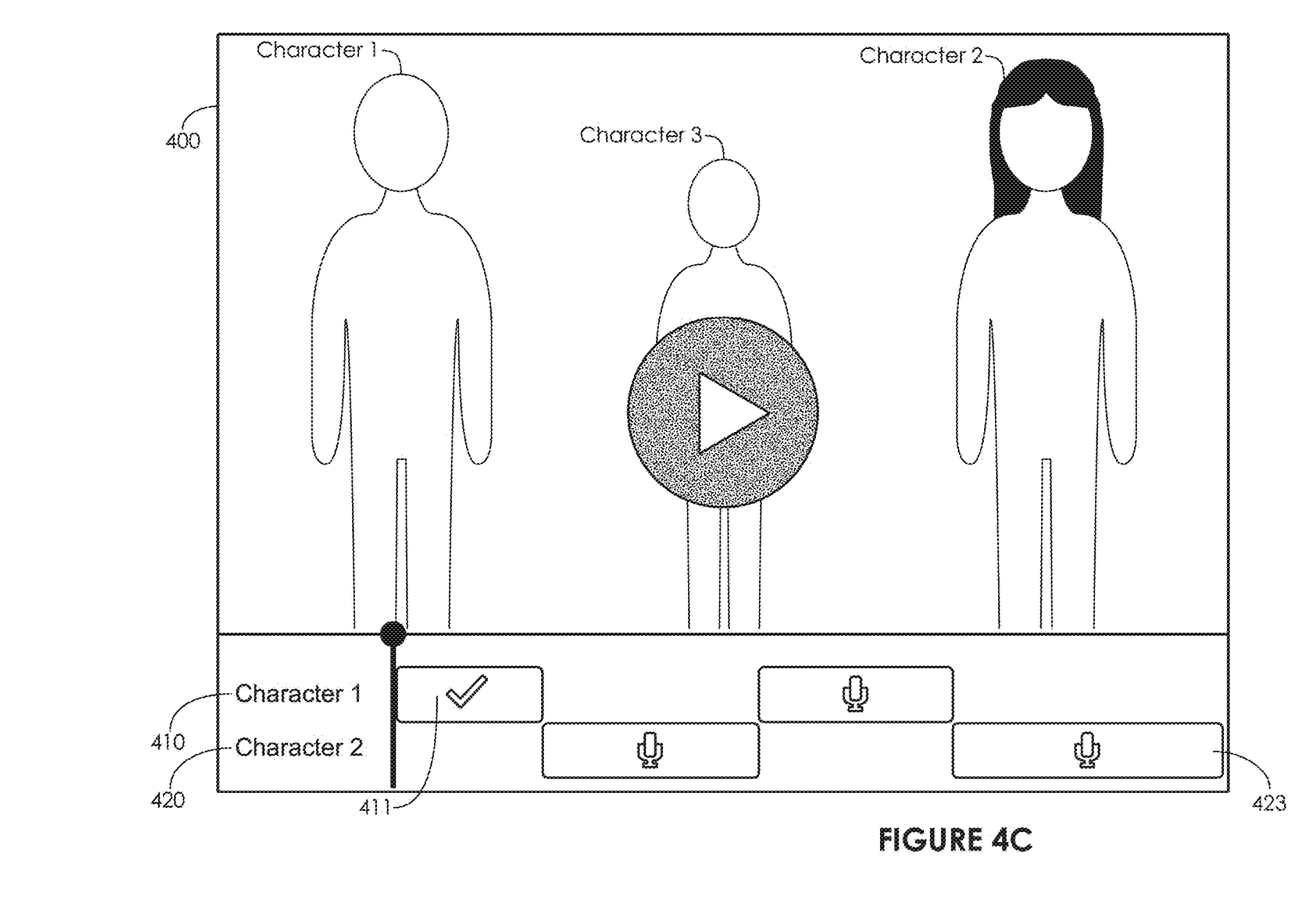
Figure 4D:
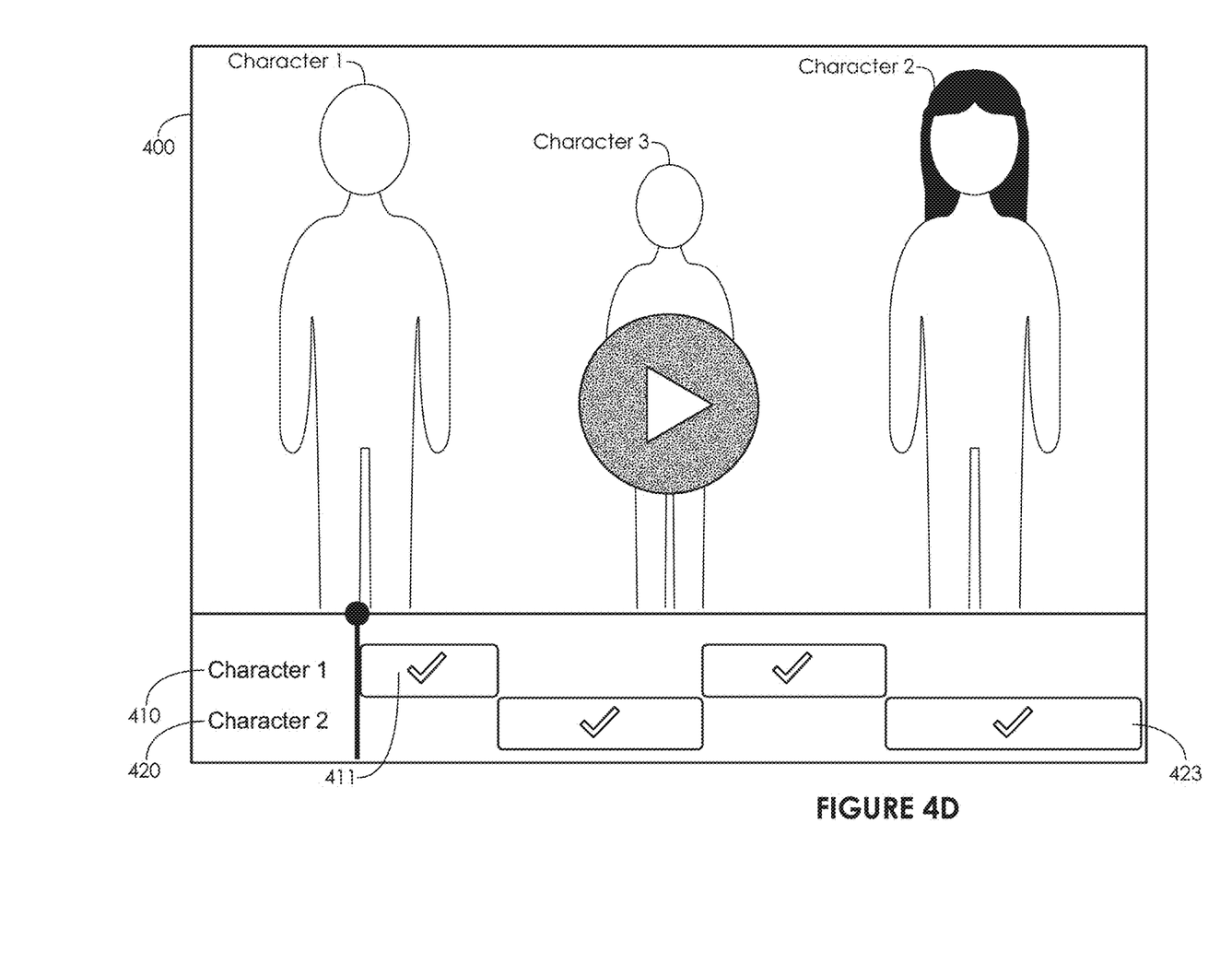
Figure 5:
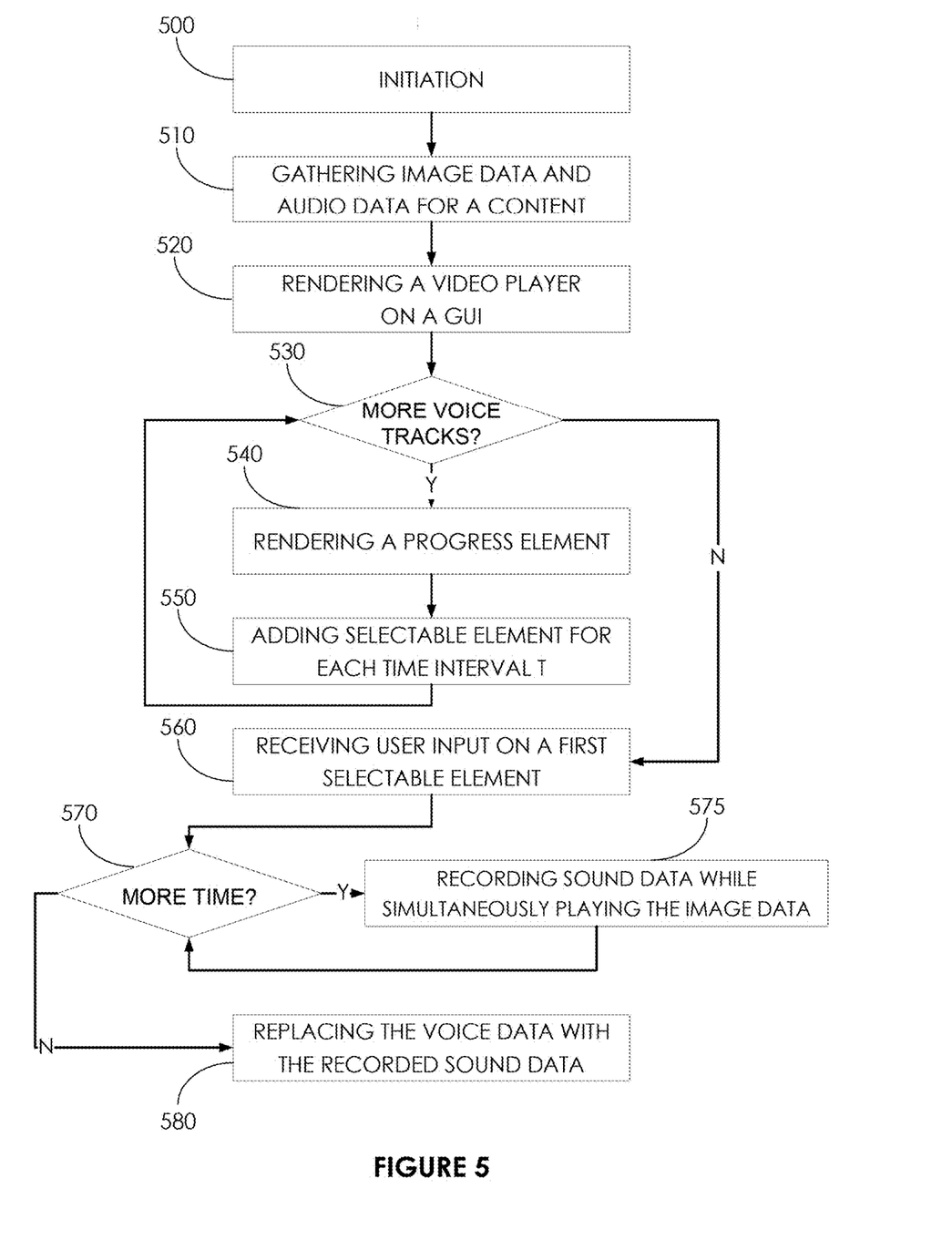

FIG. 5 is a flowchart illustrating an exemplary embodiment of the present method. Flowchart of FIG. 5 will be described in relation with examplary illustrations of FIGS. 4A to 4D. The present revoicing method is implemented on an electronic device 100 through its processor 110 seen in FIG. 1. The electronic device is assumed to be a mobile device with a local revoicing AP available therein. The electronic device may be alternatively a desktop computer connected to a media server offering through a web browser the same revoicing service.

In an initiation act 500, a media content is gathered for the electronic device 100. The content may be resident to the device on a storage 132 or streamed over a data connection. In a further step 510, the processor will collect or gather image data and audio data for the digital media content. The audio or voice data may be characterized with one or more time intervals when said voice data is to be rendered in synch with corresponding image data. The media or video content may be structured so as to present the characteristics needed in the revoicing method. Alternatively, a voice analyzing software may be used to determine the time intervals.

In a further act 520 a video player element will be rendered on a GUI of the mobile device 100. Such a GUI may be seen in exemplary illustrations of FIGS. 4A-4D, wherein a GUI 400 shows a frozen image of a video content from a cartoon with two different characters to speak in the video. As with existing video player, a play icon 405 may be available either on the video player GUI as with FIGS. 4A-4D or alternatively on a navigation or progress bar element extending along one side of the video player graphical element.

Acts 530 to 550 will allow the display on the video player GUI of a graphical or progress element representing the progress of the video, the progress element comprising one or more selectable elements, each selectable element being associated to a time interval of the voice data and positioned on the progress element according to said time interval. One progress element may be available with selectable elements rendered differently to show the different audio sources or tracks. Alternatively one progress bar may be associated with each available audio track in the media content.

As mentioned before, an audio track and/or the time intervals may be associated to a audio tag. In the illutrations of FIGS. 2 and 4, two audio tracks are available. In an additional embodiment of the present revoicing service, as long as more audio tracks, i.e. another audio tag, are available (answer Yes to act 530), the processor 110 will create and render a progress bar interface element per identified track in a further act 540. In the illustration of FIGS. 4A-4D, two progress bars 410 and 420 respectively are shown. They are further characterized with data associated with the audio tag, here the name of the characters "Character 1" for progress bar 410 and "Character 2" for progress bar 420.

In a further act 550, a selectable element will be added on the progress bar(s) for each time interval available. The selectable elements are distributed on the progress bar(s) as a function of the time interval. In other words, a selectable element for time interval [t1, t2] may extend on the progress bar from a position representing t1 to a position representing t2 to give the user a visual positioning of the voice data to be revoiced in the media content. When several progress bars are available, the selectable elements will be distributed according to their audio tag over the plurality of progress bars. Two progress elements 410 and 420 are visible on FIGS. 4A-4D, with their respective selectable elements like element 411 on the first progress bar 410 tagged "Character 1" and element 423 on the second bar 420 tagged "Character 2". Two selectable elements are provided per progress bar in the illustration of FIGS. 4A-4D as both characters in the scene corresponding to the video content 400 speak twice alternatively.

Provided one more voice track is available, the acts 530 to 550 will be repeated. When no more audio track is available (No to act 530), the present process will proceed with act 560, when a selectable element is activated, i.e. selected through a user input.

Each selectable element is a control element, which, when seleted by the user, will cause the processor to trigger the audio input element to record surrounding audio sounds while playing with the media player the image data for the associated time interval. The function rendered by the selectable element may be visually highlighted to the user with a drawing such as a microphone drawing as seen on all selectable elements shown in FIG. 4A.

In a further act 560, a user input 440 is provided on a first selectable/control element 411 as seen in FIG. 4A. Such a selection will cause the processor 110 to execute a loop comprising acts 570-575 for the duration $T_1$ of the time interval corresponding to the first selectable element 411. As long as $T_1$ is not lasped (answer No to act 570), i.e. the image data for the time interval $T_1$ has not been played completely, ambient sound will be recorded (act 575) using the microphone of the mobile device 100, while the corresponding image data for $T_1$ is played with the media player. In other words, the user will watch on the GUI the scene corresponding to the time interval he wants to revoice. Thanks to the present method and system, the user has a shortcut and direct access through a customized GUI to the portion of the video content when voice data may be revoiced and replaced with new sound data.

As seen in FIG. 4B, the first selectable element 411 may be animated with a virtual representation of the recoding progress. The animation may comprise     oscillations propotionnal to the recorded sound input,     a cursor showing the progression along the length of the first selectable element to give the user a feedback on how much time is left in the time interval $T_1$. Other visual information may comprise e.g. showing the lines corresponding to the initial voice data (when available as part of the audio data) so that the user can rephrase them with his own interpretation.

Once the time interval $T_1$ is lapsed (answer Yes to act 570), in a further act 580, the sound data recorded during the time interval $T_1$ associated to the first selectable element 411 will replace the initial audio data. Confirmation of the end of the recording for the first selectable element 411 may be visually rendered through changing initial microphone drawing on element 411 with a check mark as seen in FIG. 4C. In an additional embodiment of the present system, the state of the first selectable/control element 411 may change at the end of the recording, i.e. once its time interval $T_1$ is lapsed. Other functions may become available at this stage allowing more options for the user as explained before.

FIG. 4D. illustrate the final stage of a video content when one or more users are done revoicing the entire content. In the present illustration, the audio data was illustrated as voice data. The present teachings may be generalized to any type of audio data, including sounds like sound effects, thereby providing a user friendly GUI allowing easy recording of sound inputs for a video content.

The present embodiments were illustrated mostly using reference to touch inputs on a touch interface. The presents teaching may easily be implemented using a pointing device a stylus.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for recording voice samples for a video rendered on an electronic device comprising a display unit and a microphone, the video comprising image data and voice data, the voice data comprising one or more time intervals when said voice data is to be rendered with corresponding image data, the method being executed by a processor of the electronic device, the method comprising:
   rendering on the display unit a graphical user interface (GUI) comprising a video player element to play the video,
   displaying on the GUI a graphical or progress element representing the progress of the video, the progress element comprising one or more selectable elements, each selectable element being associated to a time interval of the voice data and positioned on the progress element according to said time interval, and
   when receiving a user selection on a first selectable element of the progress element, recording sound data using the microphone while simultaneously playing with the video player element the image data corresponding to the time interval associated to the first selectable element, which is represented by a GUI element having a length that is proportional to its associated time interval on the progress element.

2. The method of claim 1, further comprising:
   replacing the voice data for the time interval associated to the first selectable with the recorded sound data.

3. The method of claim 1, wherein each selectable element is represented by a GUI element the length of which is proportional to its associated time interval on the progress element.

4. The method of claim 3, further comprising:
   animating the first selectable element with a virtual representation of the recoding progress.

5. The method of claim 1, further comprising
   changing the state of the first selectable element once its time interval is lapsed.

6. The method of claim 1, the voice data further comprising a voice tag for each time interval, the method further comprising:
   identifying each different voice tag,
   displaying on the GUI a progress element for each identified voice tag.

7. The method of claim 6, further comprising a preliminary act of:
   analyzing the video using a voice analyzing technique,
   storing time intervals when voice data is associated to the image data of the video.

8. The method of claim 1, wherein the act of simultaneously playing the image data further comprises:
   playing the image data without the voice data corresponding to the time interval associated to the firsts selectable element.

9. An electronic device for recording voice samples for a video, the video comprising image data and voice data, the voice data comprising one or more time intervals when said voice data is to be rendered on the electronic device with corresponding image data, the electronic device comprising:
   a display unit and a microphone; and
   a processor arranged to:
      render on the display unit a graphical user interface (GUI) comprising a video player element to play the video,
      display on the GUI a graphical or progress element representing the progress of the video, the progress element comprising one or more selectable elements, each selectable element being associated to a time interval of the voice data and positioned on the progress element according to said time interval, and
      when detecting a user selection on a first selectable element of the progress element, record sound data using the microphone while simultaneously play with the video player element the image data corresponding to the time interval associated to the first selectable element, which is represented by a GUI element having a length that is proportional to its associated time interval on the progress element.

10. A non-transitory computer-readable storage medium comprising a program product stored thereon and executable by a processor in the form of a software agent including at least one software module set up to implement a method for recording voice samples for a video rendered on an electronic device comprising a display unit and a microphone, the video comprising image data and voice data, the voice data comprising one or more time intervals when said voice data is to be rendered with corresponding image data, the method being executed by a processor of the electronic device, the method comprising:
   rendering on the display unit a graphical user interface (GUI) comprising a video player element to play the video,
   displaying on the GUI a graphical or progress element representing the progress of the video, the progress element comprising one or more selectable elements, each selectable element being associated to a time interval of the voice data and positioned on the progress element according to said time interval, and
   when receiving a user selection on a first selectable element of the progress element, recording sound data using the microphone while simultaneously playing with the video player element the image data corresponding to the time interval associated to the first selectable element, which is represented by a GUI element having a length that is proportional to its associated time interval on the progress element.

* * * * *